United States Patent [19]

Waller et al.

[11] 3,948,502

[45] Apr. 6, 1976

[54] POWER-OPERATED WORK CLAMPING DEVICES

[75] Inventors: Laurence Alfred Waller; John James Rogan, both of London, England

[73] Assignee: Spenklin Limited, London, England

[22] Filed: Nov. 12, 1974

[21] Appl. No.: 523,161

[30] Foreign Application Priority Data

Nov. 26, 1973 United Kingdom............... 54735/73

[52] U.S. Cl. ........................ 269/27; 92/33; 269/32; 269/91

[51] Int. Cl.[2] ............................................ B23Q 3/08

[58] Field of Search .......... 269/27, 32, 91, 92; 92/2, 92/33

[56] References Cited

UNITED STATES PATENTS

| | | | |
|---|---|---|---|
| 3,362,301 | 1/1968 | Kohlitz | 269/27 X |
| 3,572,216 | 3/1971 | Sessody | 92/33 |
| 3,605,569 | 9/1971 | Sessody | 92/33 |
| 3,776,106 | 12/1973 | Pish | 92/33 |

*Primary Examiner*—Harold D. Whitehead
*Attorney, Agent, or Firm*—Ostrolenk, Faber, Gerb & Soffen

[57] ABSTRACT

A clamp with angular and axial movements which are effected in sequence preferably by means of a single power actuator. The clamping member is mounted within a non-rotatable piston to which it is connected by a pin or ball and inclined cam slot connection whereby axial movement of the piston produces rotary movement of the connecting member which is restrained against axial movement until the rotary movement is completed. Further axial movement of the piston then produces axial movement of the clamping member.

6 Claims, 2 Drawing Figures

POWER-OPERATED WORK CLAMPING DEVICES

This invention relates to power-operated work clamping devices and in particular to such devices as used on machine tools for holding a work piece on to a table or jig while some mechanical operation such as milling, drilling or grinding is effected.

Hithertofore, such power-operated clamping devices have included a clamping member which is subjected to an angular or swinging movement in addition to an axial movement in order to effect the clamping operation. Generally, these movements of the clamping member have been obtained simultaneously but in many uses these simultaneous movements of the clamping member are a disadvantage and an object, therefore, of the present invention is to provide an improved power-operated clamping device in which the movements are effected in sequence preferably by means of a single power actuator.

In its broadest aspect the invention provides a power-operated work clamping device which comprises a body or housing having a central bore housing a tubular piston. The piston is non-rotatably mounted in the bore but is movable axially in response to a hydraulic or pneumatic power supply. A clamping member includes a connecting rod which is fitted within the tubular piston and is connected therewith by means of a ball or pin and co-operating cam slot, the arrangement being such that axial movement of the piston transmits predetermined rotary motion to the connecting rod and clamping member. The connecting rod of the clamping member is provided with restraining means for preventing axial movement of the clamping member until the ball or pin has bottomed in the cam slot at the completion of the rotary motion imparted to the clamping member. At this time continued axial movement of the tubular piston transmits a corresponding axial movement to the clamping member so as to complete the clamping operation on the work piece.

In the preferred embodiment of the invention the restraining means for preventing axial movement of the clamping member comprises a transverse pin which is mounted in the removable end cap of the housing and is engaged by the lower end surface of the connecting member. The lower end of the connecting member is formed with an open-ended diametral slot which is positioned in line with the transverse pin at the completion of the rotary motion imparted to the connecting member thereby allowing downward axial movement of the connecting member and clamping member in response to continued axial movement of the tubular piston. At the completion of the rotary motion imparted to the connecting member the lower surface of the tubular piston engages a thrust nut carried by the connecting member so as to move the connecting member axially in the housing.

Figure 1:
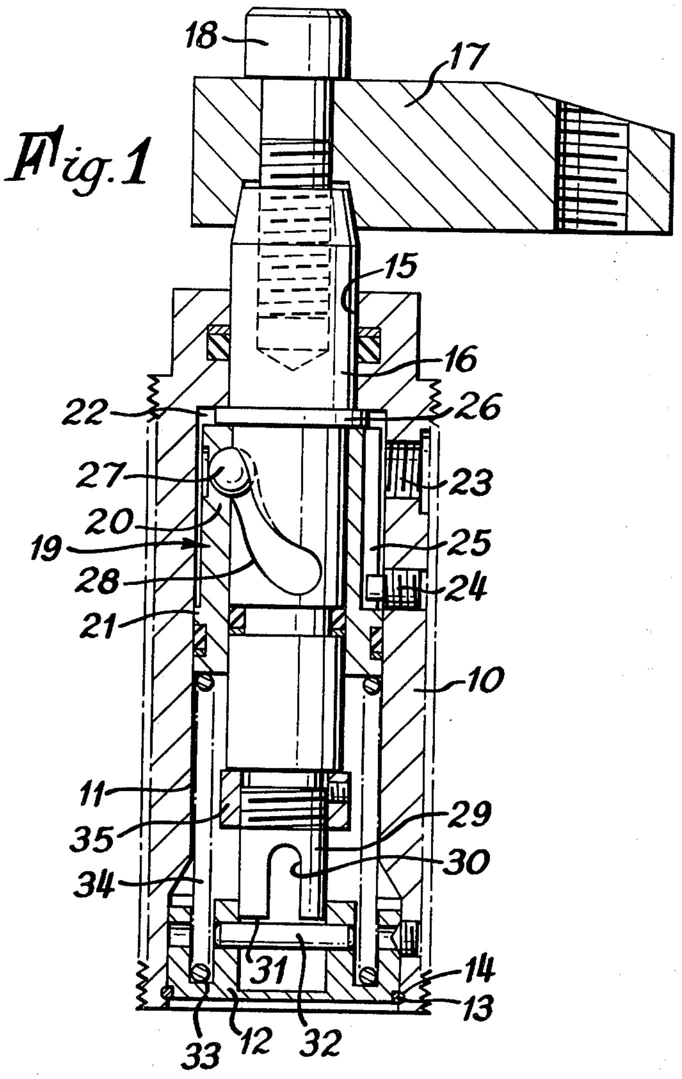
Figure 2:
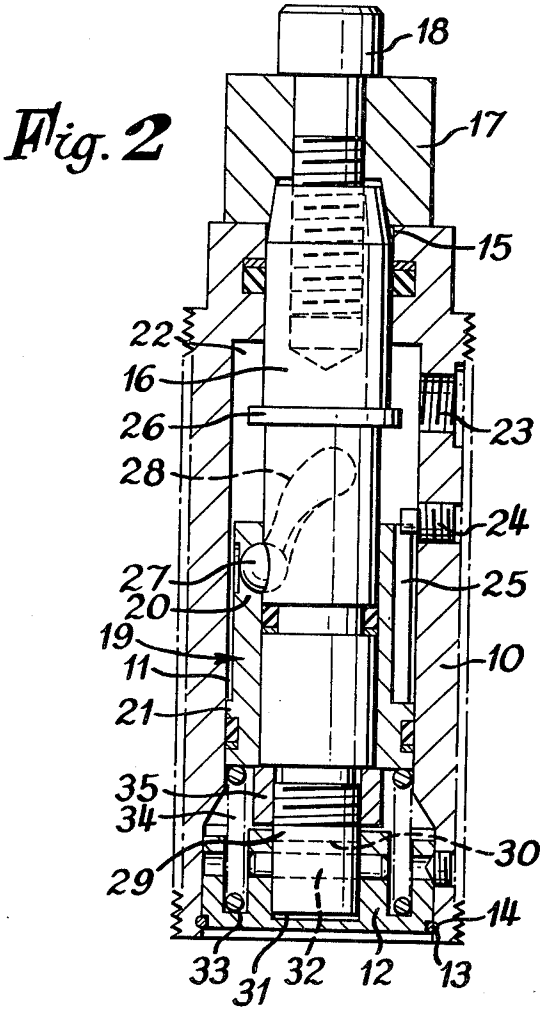

The preferred embodiment of the invention will now be described by way of example with reference to the accompanying drawings, in which:

FIG. 1 is a sectional elevation of a clamping device in accordance with the invention in its inoperative or unclamped position; and FIG. 2 is a sectional elevation similar to FIG. 1 but showing the clamping device in its operative or clamping position. piston Referring to the drawings, the power-operated work clamping device comprises an elongated body or housing 10 which is normally located in a vertical position and is externally threaded as shown to enable the device to be mounted on a work bench or other operating surface. The housing 10 has a central cavity or bore 11 which is closed at its lower end by a removable end cap 12 which is normally retained in position by a circlip 13 engaging a groove 14 in the inner wall of the housing. The other end of the housing 10 is closed but is formed with a central aperture 15 communicating with the bore 11 for receiving the connecting rod 16 of a clamping member 17 which is rigidly attached to the rod 16 by a bolt 18.

The connecting rod 16 extends slidably through the aperture 15 in the closed upper end of the body 10 and is mounted within a tubular piston 19 located in the bore 11. The tubular jpiston 19 comprises an upper portion 20 which fits loosely within the bore 11 and a lower portion 21 which sealingly engages the inner wall of the bore. The piston 19 is slidably movable within the body 10 in a downward direction from the position shown in FIG. 1 in response to fluid pressure introduced into the chamber 22 by means of the inlet port 23 in the wall of the housing.

Rotational movement of the piston 19 relative to the housing 10 is prevented by a means of a socket screw 24 which is mounted in the wall of the housing 10 and which projects inwardly to engage a longitudinal groove 25 formed in the upper portion 20 of the piston 19.

The connecting rod 16 is formed with an annular projection 26 which in the inoperative position of the clamping device abuts the upper closed end of the housing 10 and is similarly engaged by the upper end of the tubular piston 19. The annular projection 26 may be formed integrally with the connecting rod 16 or it may comprise a separate washer or circlip.

The tubular piston 19 is operatively connected with the connecting rod 16 by means of a pin or ball and cam slot connection. In the embodiment described a ball 27 is mounted in the wall of the upper portion 20 of the tubular piston so as to engage a slot 28 formed in the periphery of the connecting rod 16. Only one ball 27 and slot 28 is shown but it will be appreciated that more than one ball and slot may be provided around the periphery of the connecting rod 16. The slot 28 is of elongated shape and extends axially and also angularly about the connecting rod through 90° so as to provide a cam slot for the ball 27.

The lower end of the connecting rod 16 extends to the lower part of the bore 11 in the housing 10 and is provided with a portion 29 of reduced diameter. The portion 29 is formed with a transverse slot 30 and in the inoperative position of the clamping device as shown in FIG. 1 the lower end face 31 of the connecting rod 16 abuts or is positioned just above the transverse pin 32 mounted in the removable end cap 12. The end cap is also formed with an annular groove 33 which provides a seating for the lower end of a compression spring 34, the upper end of which abuts the lower end surface of the lower portion 21 of the tubular piston 19.

The assembly is completed by a thrust nut 35 which is threadably mounted on the lower portion 29 of the connecting member 16. The thrust nut is of larger diameter than the main portion of the connecting member 16 so as to form an upper projecting abutment surface for the lower edge of the tubular piston 19 as will be hereinafter described.

In the inoperative or unclamped position of the device as shown in FIG. 1 the tubular piston 19 is in its upper position in the housing 10 abutting the projection 26 on the connecting member 16. The ball 27 supported in the inner wall of the tubular piston 19 is now located at the upper end of the cam slot 28 and it will be seen that the lower end surface 31 of the connecting rod 16 is positioned above the transverse pin 32 with the slot 30 at right angles to the pin 32.

In the operation of the clamping device, as shown in its inoperative position in FIG. 1, the application of hydraulic or pneumatic pressure to the chamber 22 above the tubular piston 19 provides for an axial or downward movement of the piston 19 within the housing 10. The ball 27 is carried axially with the piston 19 which cannot rotate during this movement due to the engagement of the socket screw 24 within its longitudinal slot 25. At the same time axial downward movement of the connecting rod 16 is prevented by reason of the engagement of the bottom face 31 of the connecting rod with the pin 32. A rotary motion is, therefore, imparted to the connecting rod 16 due to the downward movement of the ball 27 along the cam slot 28 in the connecting rod 16. During this rotary movement of the connecting rod the slot 30 in the bottom of the connecting rod is moved angularly through 90° until it is positioned in line with the pin 32. At this time the ball 27 will have bottomed-out in the cam slot 28 as the tubular piston moves downwardly against action of the compression spring 34. This rotary movement is shown as 90° but any predetermined rotary movement can be imparted by suitable design of the clamping device.

At the completion of the rotary motion of the connecting rod as mentioned above the ball 27 has bottomed-out in the cam slot 28 and in addition the lower surface of the portion 21 of the tubular piston 19 has engaged the upper projecting surface of the thrust nut 35. Any further downward axial movement of the tubular piston 19 thereby applies an axial force to the connecting rod through the thrust nut 35 whereby the piston 19 and connecting rod 16 move together in an axial direction downwardly in the housing, the axial movement of the connecting rod 16 being now permitted due to the sliding engagement of the transverse pin 32 into the open-ended slot 30 in the bottom of the connecting rod. Throughout the stroke of the tubular piston 19 compression spring 35 is continuously compressed so that upon release of the fluid pressure the clamping device will return to its inoperative position. The operative or clamping position of the device is shown in FIG. 2 of the drawings.

The power-operated clamping device as described above has an important advantage in that rotary or swinging movement is imparted to the member 17 before any axial or downward movement takes place towards the work to be clamped. The two movements imparted to the clamping member are quite distinct but follow in sequence and are effected by the operation of a single power-actuated piston within the body or housing of the clamp.

Although the preferred embodiment of the invention is described with a single ball and cam slot it will be appreciated that more than one ball and co-operating slot can be provided. If desired, the cam slot or slots may be formed on the inner wall of the tubular piston and the balls carried by the connecting member. The balls may be replaced by projecting pins and if desired a single transverse pin may be provided extending from the tubular piston through a cam slot in the connecting member. In such an arrangement the transverse cross pin may also extend into longitudinal slots in the side wall of the housing to prevent relative rotary movement of the tubular piston within the housing.

We claim:

1. A power-operated work clamping device comprising a housing having a central bore, a tubular piston non-rotatably positioned in said bore and axially movable therein in response to the application of fluid pressure, means in said housing engaging said piston for restraining rotation thereof, and a clamping member having a connecting rod extending into said housing and fitting within said piston for relative angular and axial movement thereto, said piston being connected to said connecting rod by a projecting means from one of said piston and said rod and a co-operating cam slot in the other of said piston and said rod and into which said projecting means extends, said cam slot being shaped so that axial movement of said piston over a first distance in one direction produces a first angular movement of said connecting rod and clamping member, and thereafter axial movement of said piston over a second distance in said one direction produces a second axial movement of said connecting rod and said clamping member when said projecting means has reached the end of said cam slot, said cam slot being of a length to extend for said first distance and to end at the end of said first distance, axial motion restraining means located in said housing and positioned to be engaged by said connecting rod to prevent motion of said connecting rod in said one direction during angular movement thereof, whereby said connecting rod is restrained against axial movement during movement of said projecting means along said co-operating cam slot.

2. A clamping device as claimed in claim 1, wherein said connecting rod has a lower end face and said restraining means comprises a transverse pin mounted in said housing for engagement by said lower end face of said connecting rod.

3. A clamping device as claimed in claim 2, wherein said lower end face of said connecting rod is formed with a diametral slot which is positioned angularly transverse with respect to said pin to prevent downward movement of said connecting rod until said first angular movement of said connecting rod has been completed, and said slot being so oriented that upon completion of said first angular movement of said connecting rod, said slot aligns with said pin.

4. A clamping device as claimed in claim 1, wherein said connecting rod is provided with a thrust means so located on said connecting rod as to be engaged by said tubular piston at the completion of the first angular movement of said connecting rod, said second axial movement of said connecting rod and clamping member being effected by engagement of said tubular piston with said thrust means.

5. A clamping device as claimed in claim 1, wherein said means for restraining said tubular piston against angular movement comprises a socket screw carried by said housing and a longitudinal slot formed in said piston with which said socket screw is in engagement.

6. A clamping device as claimed in claim 1, wherein said cam slot is formed in said connecting rod and said projecting means is mounted in the interior wall of said tubular piston for engagement with said cam slot.

* * * * *